Aug. 27, 1940.　　　　J. A. DANIELL　　　　2,212,857

FLEXIBLE COUPLING

Filed Oct. 28, 1938

INVENTORS
JOHN ARTHUR DANIELL
BY
Lawrence C. Witker
ATTORNEY

Patented Aug. 27, 1940

2,212,857

UNITED STATES PATENT OFFICE 2,212,857

FLEXIBLE COUPLING

John Arthur Daniell, Coventry, England, assignor to Spicer Manufacturing Corporation, Toledo, Ohio Application October 28, 1938, Serial No. 237,430
In Great Britain October 28, 1937

4 Claims. (Cl. 64—13)

This invention relates to flexible transmission couplings, particularly for use in the drive of a motor-vehicle, of the kind incorporating driving and driven pins endwise located in the bores of rubber bush-like portions carried by a coupling member and having grooves on their end faces which are coaxial with their bores, the pins being arranged in a circle with their axes substantially parallel to one another and the pins of one set alternating with those of the other.

According to the invention, the coupling member is in the form of a non-rigid disc. It may be formed of superposed layers of rubber-impregnated fabric vulcanized together, having holes in it supporting rubber bushes which are more flexible than the disc and are vulcanized thereto. Or it may be of rubber and the bush-like portions also of rubber, the whole being formed integrally. The external periphery of the disc may be reinforced by a rigid or by a fabric or other non-rigid wrapping if desired. The disc may be an annulus having its internal periphery thus reinforced. Or, when not an annulus, it may be internally reinforced by diametrical fabric strips extending between adjacent pairs of the bush-like portions.

Figure 1:
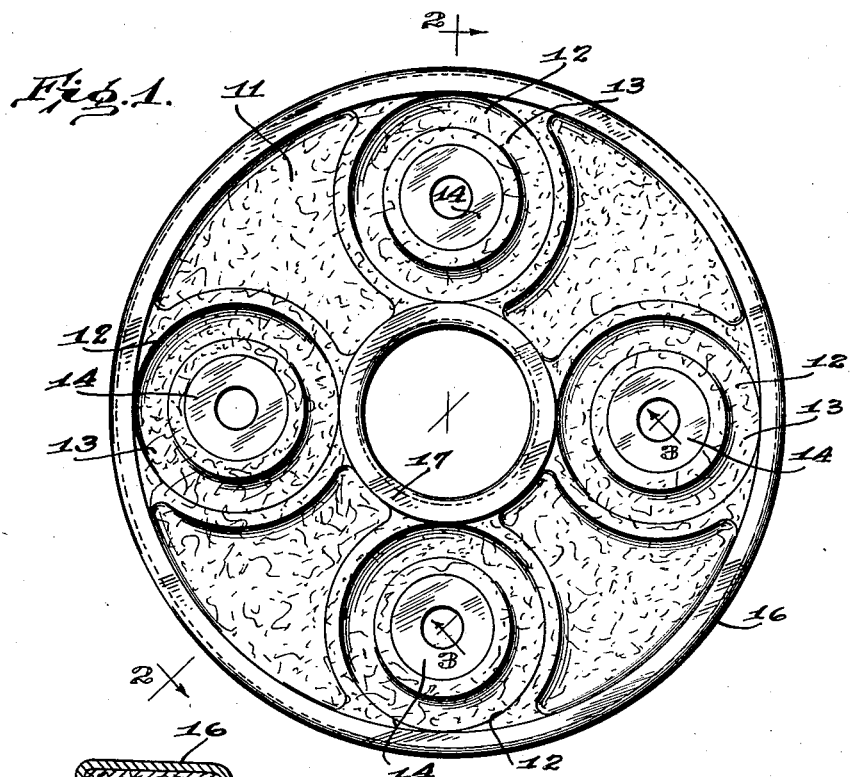
Figure 2:
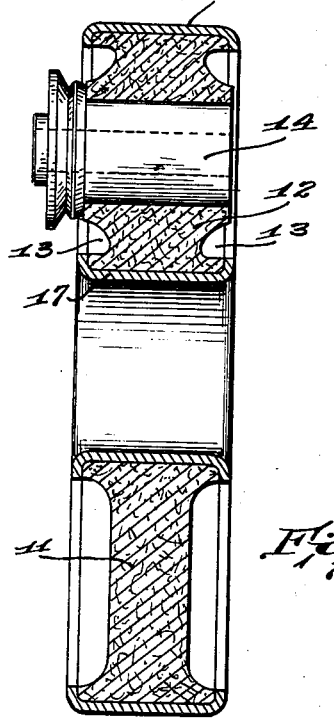
Figure 3:
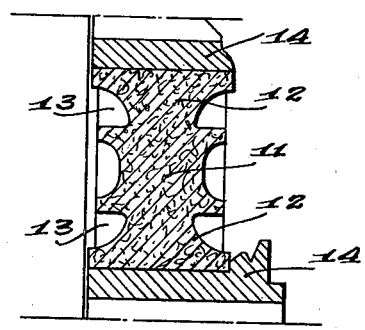

In the accompanying drawing:

Figure 1 is an elevation of one form of coupling according to the invention, Figure 2 being a sectional elevation thereof, taken on the line II—II of Figure 1; and Figure 3 is a fragmentary section taken on the line III—III of Figure 1.

The same reference numerals are applied as far as possible to similar parts throughout the accompanying drawing.

In the construction of Figures 1 to 3 the flexible disc 11 is a rubber annulus having four symmetrically-spaced bush-like portions 12 which are of rubber and are formed integrally with the rest of the disc. At the side faces of each bush-like portion are annular grooves 13 coaxial with its bore. Secured in their bores by vulcanization are metal sleeves 14, these in turn carrying driving and driven pins. A pair of diametrically-opposite pins is connected in any convenient manner to a driving yoke, the other two pins being connected to a driven yoke. In this instance the outer periphery of the disc 11 is disposed within and vulcanized to a thin metal reinforcing ring 16 whilst the inner periphery is disposed round and vulcanized to another thin metal reinforcing ring 17.

In this way I am able to build robust couplings with which very satisfactory results can be obtained. The couplings have features in common with those of the well-known Hardy disc, but they are more robust and, in particular, fraying at the edges due to flexing is reduced. Moreover, the Hardy disc was unsuitable for use where axial displacement occurred between the driving and driven shafts, whereas such axial displacement can take place with the joint of the invention.

In the construction of Figures 1 to 3 all of the disc will be effectively utilized in transmitting the drive without those portions buckling which act in compression. Such portions with an ordinary Hardy disc are normally inactive in helping to transmit the drive and buckle when the other portions, which act in tension, stretch. The coupling of Figures 1 to 3, therefore, when of the same size as, and formed from rubber of substantially the same strength as the material of, a Hardy disc, will last approximately twice as long. Moreover, the rivets and plates of the Hardy disc are not required.

Having now particularly described and ascertained the nature of my said invention and in what manner the same is to be performed, I declare that what I claim is:

1. A flexible transmission coupling including driving and driven pins which are arranged in a circle with their axes substantially parallel to one another and with the pins of one set alternating with those of the other, and a flexible coupling disc in holes in which the pins are endwise located, the disc having grooves coaxial with the holes so that the portions of the disc in which the pins are actually endwise located are connected to the rest of the disc by annular portions of less axial dimension, thus facilitating axial movement of the pins relatively to the rest of the disc.

2. A flexible transmission coupling, according to claim 1, in which the disc has its outer periphery reinforced by a relatively rigid member.

3. A flexible transmission coupling, according to claim 1, in which the disc is an annulus having its inner periphery reinforced by a relatively rigid member.

4. A flexible transmission coupling including driving and driven pins which are arranged in a circle with their axes substantially parallel to one another and with the pins of one set alternating with those of the other, and a rubber annulus, having thin metal rings vulcanized to its inner and outer peripheries and having holes in which the pins are secured by vulcanization, the disc having grooves coaxial with the holes so that the portions of the disc in which the pins are actually endwise located are connected to the rest of the disc by annular portions of less axial dimension, thus facilitating axial movement of the pins relatively to the rest of the disc.

JOHN ARTHUR DANIELL.